Patented Nov. 28, 1950

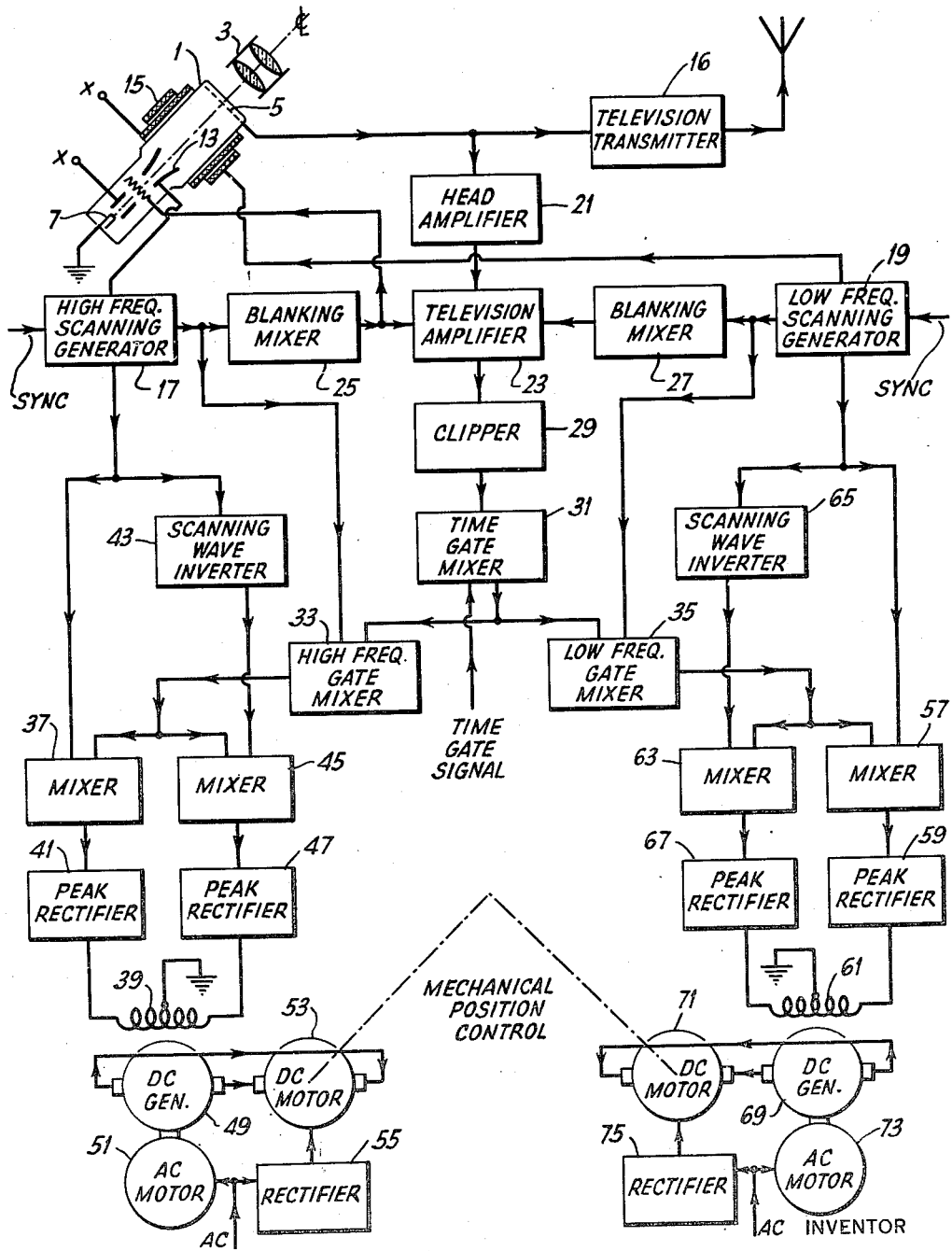

2,532,063

UNITED STATES PATENT OFFICE 2,532,063

POSITION INDICATING SYSTEM

Philip J. Herbst, Princeton, N. J., assignor to Radio Corporation of America, a corporation of Delaware Application September 7, 1946, Serial No. 695,577

12 Claims. (Cl. 178—6.8)

This invention relates to a method and means for position finding and more particularly to a system wherein an image is scanned electrically and the position of a specific point in the image is located by resolving the signal obtained from the scanning operation.

Many electronic devices have been developed and produced for the purpose of position finding. Radar is such a device and may be used to locate objects in darkness, fog, or storm. The principle upon which it operates is similar to the principle of sound echoes or wave reflection. If a person shouts toward a cliff or some other sound reflecting surface, he hears the shout returned from the direction of the cliff. What actually takes place is that the sound waves generated by the shout travel through the air until they strike the cliff, then they are bounced back or reflected, some of which return to the original spot.

If a directional device is built to transmit and receive the sound, the direction from which the echo is received will indicate the direction of the object.

In radar sets, however, a radio wave of an extremely high frequency is used instead of a sound wave. The radar set picks up its own echo and by properly orientating a directional type of antenna, the object's position can be determined.

The radio wave must, however, strike an object which is a good conductor of electricity and is large compared to a quarter wave length of the transmitted energy in order that a strong echo be returned to the set. If the object is a poor conductor or is small, the reflected energy is small and the echo is weak.

In many applications of electronics to commercial devices, it is desirable to provide an electronic device which will locate objects which are not necessarily electrical conductors and which may be relatively small in size. The objects may also be positioned on a conveyor or other mechanical device which would make position finding by the reflection of radio waves impractical.

It is very often the case, however, that objects of the class just described as being unsuitable for detection by means of radio have a physical characteristic which makes them subject to detection by optical means. The human body, for example, is a generally unsatisfactory object for detection by radio means, particularly when the body is adjacent to a relatively good conductor of electricity such as the ground or construction containing metal in any form. The body can, however, generally be distinguished optically from its adjacent surroundings. It is upon this principle that the present invention functions.

The electrical transmission of optical images, such as television images, is accomplished by analyzing a scene into its picture elements which are selected from the picture area in the orderly sequence of scanning and transmitting one after the other. Since the scanning and picture repetition processes are essentially artificial ones, there may be selected arbitrarily the total number of scanning lines, the number of picture elements in each line, the sequence of transmission of the lines, the width of the scanning pattern relative to its height, and the rate of picture repetition.

It is well known that during the scanning operation a signal is produced, the amplitude of which is dependent upon the brightness of the elements of the image.

It will therefore be seen that the relative position of a predetermined point in an image can be located by electronic scanning of the image.

According to this invention, an image of an area in which there is located a point or object is scanned with an electron beam and the relative position of the point or object is derived from the signal obtained from the scanning operation.

If the point or object, the position of which is being determined, moves with respect to the position finder, an electro-mechanical circuit can be provided which will cause the position finder to follow the movement of the point or object.

According to this invention in one of its preferred forms, the position of an image tube in a television transmitter is automatically controlled such that it will follow a moving point or object in the field of view.

The primary object of this invention is to provide an improved relative position indicating system.

Another object of this invention is to provide an electronic system for equipment orientation.

Still another object of this invention is to provide an improved television system wherein the television camera is automatically orientated.

Other and incidental objects of the invention will be apparent to those skilled in the art from a reading of the following specifications and an inspection of the accompanying drawing in which there is shown schematically this invention in one of its preferred forms.

Image tube 1 has an optical lens system 3.

The image tube has three important functions. It must be a viewing device capable of forming an image of the scene before it. It must be an image analyzer capable of dissecting the image into picture elements, and it must be a photoelectrical conversion device capable of generating a chain of electrical impulses that correspond to the picture elements.

The image tube 1 can take many different forms, but for the purpose of explanation an orthicon tube (which is of the so-called "storage" variety) will be illustrated as part of this invention. Such a tube is well known and was described by Iams and Rose in the "RCA Review" for October 1939, vol. IX, No. 2, at page 186 et seq., in an article entitled "The Orthicon, a Television Pickup Tube."

The principle of light storage employed in image tubes is well known to the art and involves setting up an image plate or mosaic 5, the surface of which is illuminated with an object through the lens system 3. The light sensitive electrode 5 possesses the characteristics of photosensitivity and electrical insulation. The photosensitivity characteristic is employed to release electrons from the surface in the form of an electron image.

An electron gun containing the cathode 7 and anode 9 and a control electrode 11 produces a narrow beam of electrons which is utilized as a scanning agent and is directed toward the light sensitive electrode 5.

The electron beam is deflected to scan the area of the light sensitive electrode 5 by the high frequency scanning plates 13 and the low frequency scanning coils 15. The high frequency scanning plates 13 may, for example, deflect the electron beam horizontally or in azimuth, and the low frequency scanning coils 15 may deflect the scanning beam vertically or in elevation.

It is necessary to provide a scanning pattern which will provide a signal from which may be derived an expression of relative position. The pattern must be composed of a set of lines spaced the width of the electron beam at the point of intersection of the beam and the light sensitive electrode 5 so that the total area of the electrode 5 will be scanned. The speed of the scanning motion must be constant along each scanning line in order that relative position data may be transmitted electrically. The aspect ratio of the scanning pattern will take a form dependent upon the shape of the electrode 5 and may, for example, be a ratio of 4 to 3. The scanning pattern made standard for the transmission of television signals can be utilized in the practice of this invention. It is therefore not necessary to have a separate image tube for control, but a portion of the signal derived from the television camera can be utilized for providing orientation. Image tube 1 can therefore also be the television camera utilized with the television transmitter 16.

The two-direction deflection which is necessary to produce such a scanning pattern is furnished by exciting the high frequency scanning electrodes 13 with the signal from a high frequency scanning generator 17. The deflection coil 15 is excited by a deflection signal from low frequency scanning generator 19.

Both high frequency scanning generator 17 and low frequency scanning generator 19 may take any of the well known forms of deflection signal generators, such as, for example, shown and described in U. S. Letters Patent, No. 2,101,520, granted to W. A. Tolson et al. on December 7, 1937. The scanning generators may obtain and synchronize under the control of a signal from an external source, as indicated in the drawing.

When the scanning operation begins, the scanning beam or spot moves at constant speed along the first line until it reaches the edge of the pattern. At the end of this line, the beam motion is suddenly reversed, and it moves as quickly as possible to the opposite edge of the pattern. During this retrace motion the beam is inactive, or suppressed.

When the beam reaches the side of the pattern from which it began its scanning operation, it is ready to trace out the second active line, consequently the beam impact at the beginning of the second active line must light at a slightly different position and adjacent to the position of the first active line.

The principle on which the orthicon depends is the use of an electron beam of low velocity for scanning the mosaic light sensitive electrode 5. Such scanning beam electrons as are necessary to neutralize the charge built up by the impinging light image are collected by the electrode 5, and the variation in this collection current may constitute a signal representative of the illumination of the scanned element that is transmitted to the head amplifier 21 and thence to the television amplifier 23.

The head amplifier 21 and the television amplifier 23 must take the form of broad band or video amplifiers in order to pass the range of frequencies which result from the scanning operation.

The point or object in question may be more readily identified if its color or light and dark characteristics are such that the scanning operation will produce a characteristic frequency which can be selected from the scanning signal. This can be accomplished by providing the point or object in question with a predetermined pattern that will produce a characteristic frequency during the scanning operation. The head amplifier 21 or the television amplifier 23 may then contain a peaking stage of amplification which will cause a strong signal to be passed during the short interval that the point or object in question is being scanned.

Blanking mixer 25 provides a blanking signal for amplifier 23. As has been explained above, there are certain intervals during the scanning operation during which time no useful signal is developed. The time occupied by the return of the electron beam to the start of another scan may produce a spurious signal. It is therefore necessary to periodically make inoperative the television amplifier so that no signal will be transmitted during that portion of time. This can be accomplished by blanking or so biasing the amplifier 23 during such intervals that it will not pass the signal. This is accomplished with a blanking signal derived from high frequency scanning generator 17 and the blanking mixer 25. The blanking signal is applied to television amplifier 23 and also to control electrode 11. The image or camera tube therefore becomes inactive at the conclusion of each scanning line while the scanning beam is retracing to the position of the next scanning line. During the retrace interval, therefore, no image information is transmitted to the head amplifier 21.

The blanking mixer 25 can take the form of an amplifier especially designed for the purpose and known in the television art either as a control amplifier or a blanking and mixing amplifier. A typical blanking mixer is shown and described in a report LB—453 of the RCA License Laboratory by A. A. Barco and entitled "A Video Mixing Amplifier," which was published October 11, 1938.

The signal derived from the scanning or camera tube during the interval between each low frequency scanning is also spurious and must be eliminated. This is accomplished by providing a second blanking mixer 27 which causes television amplifier 23 to be inactive during the interval between low frequency scannings.

A clipper circuit 29 is connected to television amplifier 23. It is necessary in the practice of this invention to provide a signal pulse each time the desired point or object is scanned whose amplitude is of a predetermined level. Such a pulse can be provided by clipping, at a uniform level, a signal whose amplitude varies and whose amplitude is always greater than the amplitude of the clipped signal. The clipping action can be performed by applying the signal to a thermionic tube of the diode or triode or pentode type which is so biased that it will not pass more than a predetermined amount of current. The clipper circuit will therefore provide an output signal having a uniform amplitude.

The signal passes from the clipper circuit 29 to a time gate mixer 31.

The time gate mixer 31 is designed to transmit signals only during a predetermined time interval. Time gate mixer 31 may consist of a form of multivibrator designed as an electronic switch which permits an amplifier circuit, which may be part of the mixer, to operate only during a predetermined time interval. The predetermined time interval may be recurring at an arbitrary frequency or it may recur at a frequency controlled by the synchronizing signals applied to the high frequency scanning generator 17 or the low frequency scanning generator 19.

The high frequency gate mixer 33 is connected to the time gate mixer 31 and provides an electrical gate whose repetition frequency is controlled by the high frequency scanning generator 17. It will be seen that high frequency gate mixer 33 will permit the selection of any time interval occurring at the same relative position in each scanning line.

There is also provided a low frequency gate mixer 35 which performs the same function as high frequency gate mixer 33, except that it derives its repetition rate from low frequency scanning generator 19 and can be adjusted to provide an electrical gate during any interval of time occupied by a cycle of the low frequency scanning generator 19.

The high frequency gate mixer 33 and the low frequency gate mixer 35 may be of the same type as time gate mixer 31.

Mixer 37 combines the output signal from high frequency gate mixer 33 with the sawtooth wave generated by the high frequency scanning generator 17, and passes it through the D. C. generator exciter coil 39 through a peak rectifier 41.

By combining the sawtooth wave of high frequency scanning generator 17 and the signal pulse of predetermined amplitude, it will be seen that the height of the pulse will be governed by its relative position on the sawtooth wave. If the pulse occurs at the beginning of the sawtooth wave, its height will be relatively low. If, however, the pulse occurs near the end of the sawtooth wave, the height of the pulse will be relatively greater. The peak rectifier 41 will produce a voltage in the coil 39 which is dependent upon the relative height of the signal pulse. If the pulse is higher as a result of arriving late on the sawtooth wave, the voltage in coil 39 will be greater than it would have been if the pulse arrived early on the sawtooth wave. It therefore follows that the voltage in the coil 39 resulting from peak rectifier 41 will be a function of the relative position of the selected point on the scanning line produced by the high frequency scanning generator 17.

By providing a scanning wave inverter 43, a mixer 45, and a peak rectifier 47, an inverted signal may be passed through coil 39 such that the inverted signal will neutralize its complementary signal when the pulse occurs in the center of the sawtooth wave generated by the high frequency scanning generator 17 or when the point in question of the image is centered with respect to the scanning line generated by the high frequency scanning generator 17.

If the pulse occurs at the beginning of the sawtooth wave, the voltage in coil 39 resulting from peak rectifier 41 will be relatively low. However, the voltage developed in coil 39 as a result of the action of peak rectifier 47 will be relatively high if the pulse occurs at the beginning of the sawtooth wave. There will then be a resultant voltage in coil 39 whose amplitude is proportional to the distance of the pulse from the center of the sawtooth wave.

D. C. generator 49, A. C. motor 51, D. C. motor 53, and rectifier 55 comprise a mechanical drive system which will convert an electrical potential into a mechanical motion, its direction of motion dependent upon the polarity of the electrical potential and its speed depending upon the amplitude of the electrical potential. Such a system is well known in the art and any similar type system may be used in the practice of this invention.

The D. C. generator 49 contains coil 39 for its field excitation. The D. C. generator 49 is driven by A. C. motor 51. The magnitude and the polarity of the voltage output of D. C. generator 49 will be dependent upon the resultant voltage in coil 39. The D. C. motor 53 will therefore supply a mechanical drive whose direction and velocity will be dependent upon the resultant potential in coil 39. In practical installations, the D. C. motor 53 could be at any convenient location and could, for example, control the orientation or positioning of any device in one direction, such as, for example, in azimuth.

Automatic tracking in azimuth may be obtained by mechanically coupling D. C. motor 53 to the image tube 1.

In order to provide orientation or position control or automatic tracking in another direction, such as elevation, it is only necessary to provide a second channel as illustrated, having its repetition rate controlled by the low frequency scanning generator 19.

The low frequency gate mixer 35 derives its signal from the time gate mixer 31 and obtains its repetition rate from low frequency scanning generator 19.

Mixer 57 and peak rectifier 59 provide coil 61 with a signal pulse whose amplitude is dependent upon the position of the signal pulse on the sawtooth wave generated by low frequency scanning generator 19.

Mixer 63 combines the signal pulse with an inverted sawtooth wave obtained from scanning wave inverter 65. Peak rectifier 67 is connected to mixer 63 and furnishes coil 61 with a complementary signal to that signal obtained through peak rectifier 69 to provide a resultant voltage in coil 61 whose polarity and amplitude is dependent upon the relative position of the pulse on the sawtooth wave generated by the low frequency scanning generator 19. This relative position of the pulse on the sawtooth wave is governed by the relative position of the point in question on the image in the direction of the low frequency scanning.

D. C. generator 69 contains coil 61 as its field coil. D. C. generator 69, D. C. motor 71, A. C. motor 73, and rectifier 75 provide the mechanical control in the direction of the low frequency scanning. It may also be connected to the same device to which D. C. motor 63 is connected for providing orientation, positioning in elevation. It may also be mechanically coupled to image tube 1 to provide automatic tracking in elevation.

Having now described the invention, I claim:

1. An automatic tracking system for television comprising in combination an image tube having an image electrode adapted to receive an image of an object field including a distinctive point, an electron beam for said image tube, a plurality of deflection signal generators to generate sawtooth wave deflection signals for causing said electron beam to scan said electrode, means for deriving from said image tube a signal pulse of predetermined amplitude when the image of said distinctive object field point is scanned by said electron beam, a plurality of mixer circuits for combining said pulse and said sawtooth wave deflection signals, and means responsive to the position of said signal pulse on said deflection signals to control the relative positioning of said image tube and said object field.

2. An automatic tracking system comprising in combination an image tube having an electrode adapted to receive an image of an object field including a selected distinctive point, an electron beam for said image tube, a sawtooth deflection signal generator to generate a deflection signal for causing said electron beam to scan said electrode, means having a signal clipper connected to said image tube for deriving from said image tube a signal pulse of predetermined amplitude when the image of said selected point of said object field is scanned by said electron beam, a mixer circuit for combining said pulse and said sawtooth deflection signal, and a servo mechanism coupled to said image tube responsive to the position of said signal pulse on said deflection signal to control the orientation of said image tube relative to the selected point of said object field.

3. A position control system comprising in combination an image pickup tube having a target electrode adapted to receive an image of an object field including a selected distinctive point, an electron beam for said image tube, a deflection signal generator to generate a sawtooth wave deflection signal for causing said electron beam to scan said electrode, means for deriving from said image tube a signal pulse of predetermined amplitude when the image of said selected point of said object field is scanned by said electron beam, a gate signal generator to permit transmission of signals from said image tube through said aforementioned means only during a predetermined interval of time, a mixer circuit for combining said pulse and said deflection signal, and means responsive to the position of said signal pulse on said deflection signal to control the position of said image pick-up tube relative to the selected point of said object field.

4. A position follower comprising in combination an image pick-up tube having a light sensitive electrode adapted to receive an image, an electron beam for said image tube, a deflection signal generator to generate a sawtooth deflection signal for causing said electron beam to scan said electrode, a double clipper for deriving from said image tube a signal pulse of predetermined amplitude when a selected point of said image is scanned by said electron beam, a gate signal generator to permit transmission of signals from said image tubes only during an interval of time including said signal pulse and a connection between said gate signal generator and said deflection signal generator to cause the repetition rate of said gate signal generator to be controlled by the frequency of said deflection signal generator, a mixer circuit for combining said pulse and said sawtooth wave deflection signal, and means responsive to the amplitude of the sum of said pulse and said deflection signal to control the position of said image pick-up tube.

5. An orientation control system comprising in combination an image pick-up tube having a light sensitive electrode adapted to receive an image of an object field including a distinctive point, an electron beam for said image tube, a deflection signal generator to generate a sawtooth wave deflection signal for causing said electron beam to scan said electrode, means for deriving from said image tube a signal pulse of predetermined amplitude when that portion of said electrode receiving the image of the distinctive point of said object field is scanned by said electron beam, a mixer circuit for combining said pulse and said sawtooth wave deflection signal, an inverter for said sawtooth wave deflection signal, a second mixer circuit connected to said inverter for combining said pulse and an inverted sawtooth wave deflection signal, and a circuit responsive to the difference in amplitude of the signals derived from said mixer circuits to control the orientation of said image pick-up tube relative to said distinctive object field portion.

6. A position control system for apparatus comprising in combination an image tube having a light sensitive electrode adapted to receive an image of an object field including a distinctive area, an electron beam for said image tube, a deflection signal generator to generate a sawtooth wave form deflection signal for causing said electron beam to scan said electrode, means for deriving from said image tube a signal pulse of predetermined amplitude when the image of said distinctive object field area is scanned by said electron beam, a mixer circuit for combining said pulse and said deflection signal, an inverter for said deflection signal, a second mixer circuit connected to said inverter for combining said pulse and an inverted deflection signal, a peak rectifier connected to each of said mixer circuits, and a servo mechanism connected to said peak rectifiers to position said apparatus in accordance with the relative position of said distinctive area in said object field.

7. An image follower system comprising in combination an image tube having a light sensitive electrode adapted to receive an image of an object field including a distinctive area, an electron beam for said image tube, a plurality of deflection signal generators to generate sawtooth deflection signals for causing said electron beam to scan said electrode, means for deriving from said image tube a signal pulse of predetermined amplitude when the image of said distinctive object field area is scanned by said electron beam, a plurality of mixer circuits for combining said pulse and said deflection signals, an inverter for each of said deflection signals, a second mixer circuit connected to each of said inverters for combining said pulse and the inverted deflection signals, a peak rectifier connected to each of said mixer circuits, and a servo mechanism connected to said peak rectifiers to orient said image tube relative to said distinctive object field area.

8. A position adjusting system comprising in combination an image tube having a light sensitive electrode adapted to receive an image of a field of view including a distinctive point, an electron beam for said image tube, a deflection signal generator to generate a sawtooth deflection signal for causing said electron beam to scan said electrode, means for deriving from said image tube a signal pulse of predetermined amplitude and having a predetermined frequency characteristic when the image of said distinctive point is scanned by said electron beam, a mixer circuit for combining said pulse and said deflection signal, and means responsive to the position of said signal pulse on said deflection signal to adjust the relative position of said point with respect to the center of said electrode.

9. A position following system comprising in combination an image tube having a light sensitive electrode adapted to receive an image of a field of view including a distinctive object, an electron beam for said image tube, a plurality of deflection signal generators to generate sawtooth deflection signals for causing said electron beam to scan said electrode, means for deriving from said image tube a signal pulse of predetermined frequency characteristic when the point of said image corresponding to said object is scanned by said electron beam, a plurality of mixer circuits for combining said pulse and said deflection signals, and means responsive to the height of said signal pulse on said deflection signals to follow the relative position of said point on said image.

10. A tracking system for a directive device comprising in combination an image tube having a light sensitive electrode adapted to receive an object image, an electron beam for said image tube, a deflection signal generator to generate a deflection signal for causing said electron beam to scan said electrode, said object having a distinctive light characteristic to cause a significant frequency signal during the scanning operation, a signal transmission circuit connected to said image tube and having a frequency response characteristic peaked at the frequency of said significant signal, means for deriving from said signal transmission circuit a signal pulse of predetermined amplitude when the image respresentative of said object is scanned by said electron beam, a mixer circuit for combining said pulse and said deflection signal, and means responsive to the position of said signal pulse on said deflection signal to cause said directive device to track the position of said object.

11. A television system comprising in combination an image pick-up tube having a light sensitive electrode adapted to receive an image of a field of view including a distinctive object, an electron beam for said image tube, a plurality of deflection signal generators to generate sawtooth deflection signals for causing said electron beam to scan said electrode, a signal channel for the transmission of television signals, a second signal channel including means for deriving from said image tube a signal pulse of predetermined amplitude when the image of said object is scanned by said electron beam, a plurality of mixer circuits for combining said pulse and said sawtooth deflection signals, and means responsive to the height of said signal pulse on said deflection signals for orienting said image tube to control the relative position of the image of said object on said light sensitive tube electrode.

12. An automatic tracking system comprising in combination an image pickup tube having an electrode adapted to receive an image of an object field including a distinctive portion, an electron scanning beam for said image tube, means for deriving an electrical sawtooth wave whose frequency is identical to the frequency of said electron scanning beam, means for deriving from said image tube a signal pulse of predetermined amplitude when the image of said distinctive object field portion is scanned by said electron beam, a mixer circuit for combining said pulse and said electrical sawtooth wave, and means responsive to the position of said signal pulse on said electrical sawtooth wave to control the position of said image pickup tube relative to said object field.

PHILIP J. HERBST.

REFERENCES CITED

The following references are of record in the file of this patent:

UNITED STATES PATENTS

| Number | Name | Date |
| --- | --- | --- |
| 2,164,297 | Bedford | June 27, 1936 |
| 2,166,712 | Bedford | July 18, 1939 |
| 2,201,978 | Bedford | May 28, 1940 |
| 2,209,507 | Campbell | July 30, 1940 |
| 2,227,401 | Schlesinger | Dec. 31, 1940 |
| 2,275,026 | Bedford | Mar. 3, 1942 |
| 2,306,862 | Bown | Dec. 29, 1942 |
| 2,403,023 | Reynolds | July 2, 1946 |
| 2,403,628 | Beers | July 9, 1946 |
| 2,403,975 | Graham | July 16, 1946 |
| 2,409,448 | Rost | Oct. 15, 1946 |
| 2,459,599 | Hollmark | Jan. 18, 1949 |
| 2,473,893 | Lyle | June 21, 1949 |